US012689143B2

(12) United States Patent
Chen

(10) Patent No.: US 12,689,143 B2
(45) Date of Patent: Jul. 21, 2026

(54) ADAPTER TERMINAL, CONNECTOR AND CONNECTOR ASSEMBLY WITH SIMPLIFIED STRUCTURE

(71) Applicant: Luxshare Automotive Connection System (Shanghai) Co., Ltd, Shanghai (CN)

(72) Inventor: Xiaoming Chen, Shanghai (CN)

(73) Assignee: LUXSHARE AUTOMOTIVE CONNECTION SYSTEM(SHANGHAI) CO., LTD, Shanghai (CN)

( * ) Notice: Subject to any disclaimer, the term of this patent is extended or adjusted under 35 U.S.C. 154(b) by 350 days.

(21) Appl. No.: 18/367,378

(22) Filed: Sep. 12, 2023

(65) Prior Publication Data

US 2025/0070495 A1 Feb. 27, 2025

(30) Foreign Application Priority Data

Aug. 21, 2023 (CN) ......................... 202311056884.8

(51) Int. Cl.
*H01R 13/15* (2006.01)
*H01R 13/24* (2006.01)

(52) U.S. Cl.
CPC ......... *H01R 13/15* (2013.01); *H01R 13/2407* (2013.01)

(58) Field of Classification Search
CPC .... H01R 13/15; H01R 13/2407; H01R 13/17; H01R 31/06; H01R 13/113; H01R 13/2414; H01R 13/629; H01R 24/00
See application file for complete search history.

(56) References Cited

U.S. PATENT DOCUMENTS

2022/0209450 A1 * 6/2022 Jung .................... H01R 13/187

FOREIGN PATENT DOCUMENTS

| | | | |
|---|---|---|---|
| CN | 202196958 | U | 4/2012 |
| CN | 211404933 | U | 9/2020 |
| CN | 112086839 | A | 12/2020 |
| CN | 113783031 | A | 12/2021 |
| CN | 115133312 | A | 9/2022 |
| CN | 220628430 | U | 3/2024 |

* cited by examiner

*Primary Examiner* — Joseph Ortega

(74) *Attorney, Agent, or Firm* — Birch, Stewart, Kolasch & Birch, LLP

(57) ABSTRACT

A connecting terminal configured to be connected to a plug terminal. The connecting terminal comprises a terminal connecting member and reed contact finger pieces. The terminal connecting member comprises a plate end connecting piece located below, and a plug end connecting piece located above and having a fork-shaped cross section so as to accommodate the reed contact finger pieces. The bottom of the plug end connecting piece is connected to the top of the plate end connecting piece. The reed contact finger pieces are formed by punching metal pieces, and are provided with several reed contact fingers extending side by side. According to the present application, the connecting terminal satisfies the requirement for batch production, and improves the assembling efficiency.

17 Claims, 12 Drawing Sheets

ADAPTER TERMINAL, CONNECTOR AND CONNECTOR ASSEMBLY WITH SIMPLIFIED STRUCTURE

CROSS-REFERENCE TO RELATED APPLICATION

This patent application claims priority of a Chinese Patent Application No. 202311056884.8, filed on Aug. 21, 2023 and titled "ADAPTER TERMINAL, CONNECTOR AND CONNECTOR ASSEMBLY", the entire content of which is incorporated herein by reference.

TECHNICAL FIELD

The present disclosure relates to an adapter terminal, a connector and a connector assembly, which belong to the technical field of connectors.

BACKGROUND

In the related art, a high-current connector often uses three or more parts such as a male terminal, an adapter spring and a female terminal to realize the connection function. The assembly among multiple parts is relatively complicated, the structure of the parts themselves is also complicated, and the manufacturing cost is relatively high.

SUMMARY

An object of the present disclosure is to provide an adapter terminal, a connector and a connector assembly with simplified structure, convenient in use and low in cost.

In order to achieve the above object, the present disclosure adopts the following technical solution: an adapter terminal, including: a fixing portion; a first mating portion, the first mating portion being connected with the fixing portion; the first mating portion being configured to be mated with a conductive terminal of a connector; the first mating portion including a first base portion and a first elastic piece portion at least partially protruding from the first base portion; and a second mating portion, the second mating portion being connected with the fixing portion; the second mating portion being configured to be mated with a conductive terminal of a mating connector; the second mating portion including a second base portion and a second elastic piece portion at least partially protruding from the second base portion.

In order to achieve the above object, the present disclosure adopts the following technical solution: a connector, including: a first conductive terminal; and an adapter terminal mated with the first conductive terminal; the adapter terminal, including: a fixing portion; a first mating portion, the first mating portion being connected with the fixing portion; the first mating portion being configured to be mated with the first conductive terminal; the first mating portion including a first base portion and a first elastic piece portion at least partially protruding from the first base portion; and a second mating portion, the second mating portion being connected with the fixing portion; the second mating portion being configured to be mated with a conductive terminal of a mating connector; the second mating portion including a second base portion and a second elastic piece portion at least partially protruding from the second base portion.

In order to achieve the above object, the present disclosure adopts the following technical solution: a connector assembly, including: a connector; and a mating connector; the connector, including: a first conductive terminal; and an adapter terminal mated with the first conductive terminal; the adapter terminal, including: a fixing portion; a first mating portion, the first mating portion being connected with the fixing portion; the first mating portion being configured to be mated with the first conductive terminal; the first mating portion including a first base portion and a first elastic piece portion at least partially protruding from the first base portion; and a second mating portion, the second mating portion being connected with the fixing portion; the second mating portion including a second base portion and a second elastic piece portion at least partially protruding from the second base portion; the mating connector including a second conductive terminal configured to be mated with the second mating portion of the adapter terminal.

Compared with the prior art, the adapter terminal disclosed in the present disclosure includes a fixing portion, a first mating portion and a second mating portion. The connector includes the adapter terminal and a first conductive terminal. The mating connector includes a second conductive terminal. The first mating portion can be inserted into the first conductive terminal of the connector; and the second mating portion can be inserted into the second conductive terminal of the mating connector, thereby realizing the connection of the two connectors. In addition, the mating portion (for example, the first mating portion and the second mating portion) of the adapter terminal mainly includes a base portion and an elastic piece portion protruding beyond the base portion to realize abutting connection. As a result, the overall structure of the adapter terminal, the connector and the connector assembly is simple, easy to operate, and low in cost.

DETAILED DESCRIPTION

Figure 1:
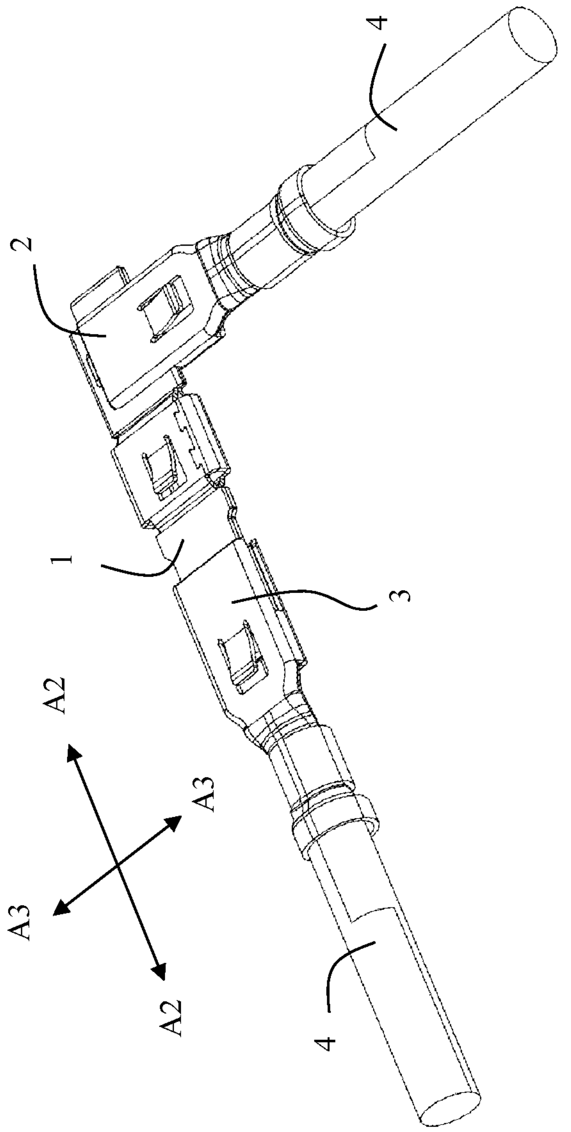
FIG. 1 is a schematic structural view of a first conductive terminal, an adapter terminal and a second conductive terminal (related cables are also shown) in accordance with a first embodiment of a connector assembly of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

In the drawings, each of two directions among a first direction A1-A1, a second direction A2-A2 and a third direction A3-A3 are perpendicular to each other.

The present disclosure discloses a connector assembly. As shown in FIG. 1, in accordance with a first embodiment of the present disclosure, the connector assembly includes a first conductive terminal 2, an adapter terminal 1, a second conductive terminal 3 and a plurality of cables 4.

The connector assembly includes a connector and a mating connector. The connector includes the adapter terminal 1 and the first conductive terminal 2. The mating connector includes the second conductive terminal 3. The adapter terminal 1 is partially inserted into the first conductive terminal 2; and the second conductive terminal 3 is partially inserted into the adapter terminal 1, so as to realize the mating between the connector and the mating connector. Other structures of the connector and the mating connector are not shown in the drawings, but they are understandable to those of ordinary skill in the art.

Figure 2:
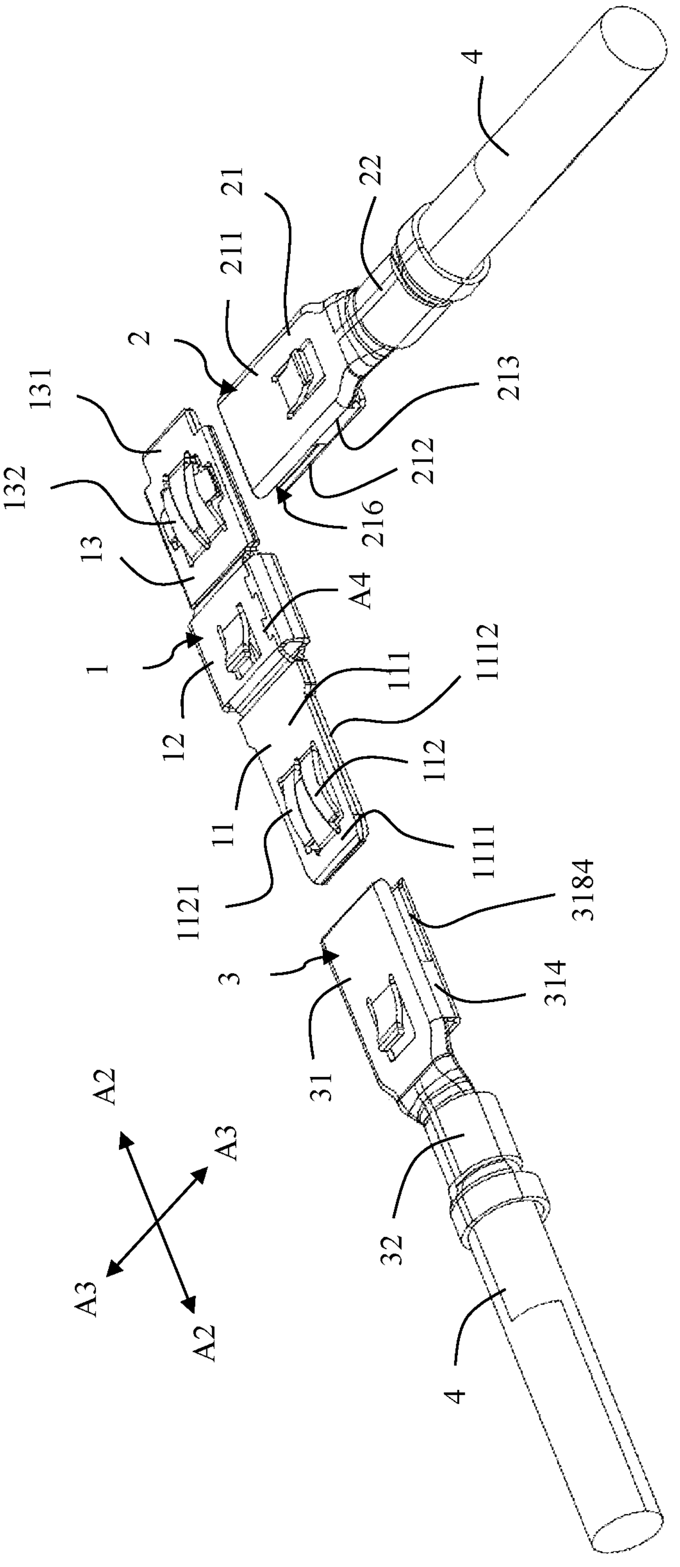
FIG. 2 is a partial exploded schematic view of FIG. 1.

Referring to FIG. 2, the adapter terminal 1 includes a first mating portion 11, a fixing portion 12 and a second mating portion 13. Along the second direction A2-A2, the first mating portion 11 is connected to one end of the fixing portion 12, and the second mating portion 13 is connected to another end of the fixing portion 12.

The first mating portion 11 includes a first base portion 111 and a first elastic piece portion 112. The first elastic piece portion 112 is configured to at least partially protrude from the first base portion 111. When the adapter terminal 1 is mated with the second conductive terminal 3, the first elastic piece portion 112 will abut against the second conductive terminal 3 for connection.

The first base portion 111 includes a first base plate 1111 and a second base plate 1112 which are disposed side by side along the first direction A1-A1. Along the second direction A2-A2, both the first base plate 1111 and the second base plate 1112 are connected to one end of the fixing portion 12.

Figure 3:
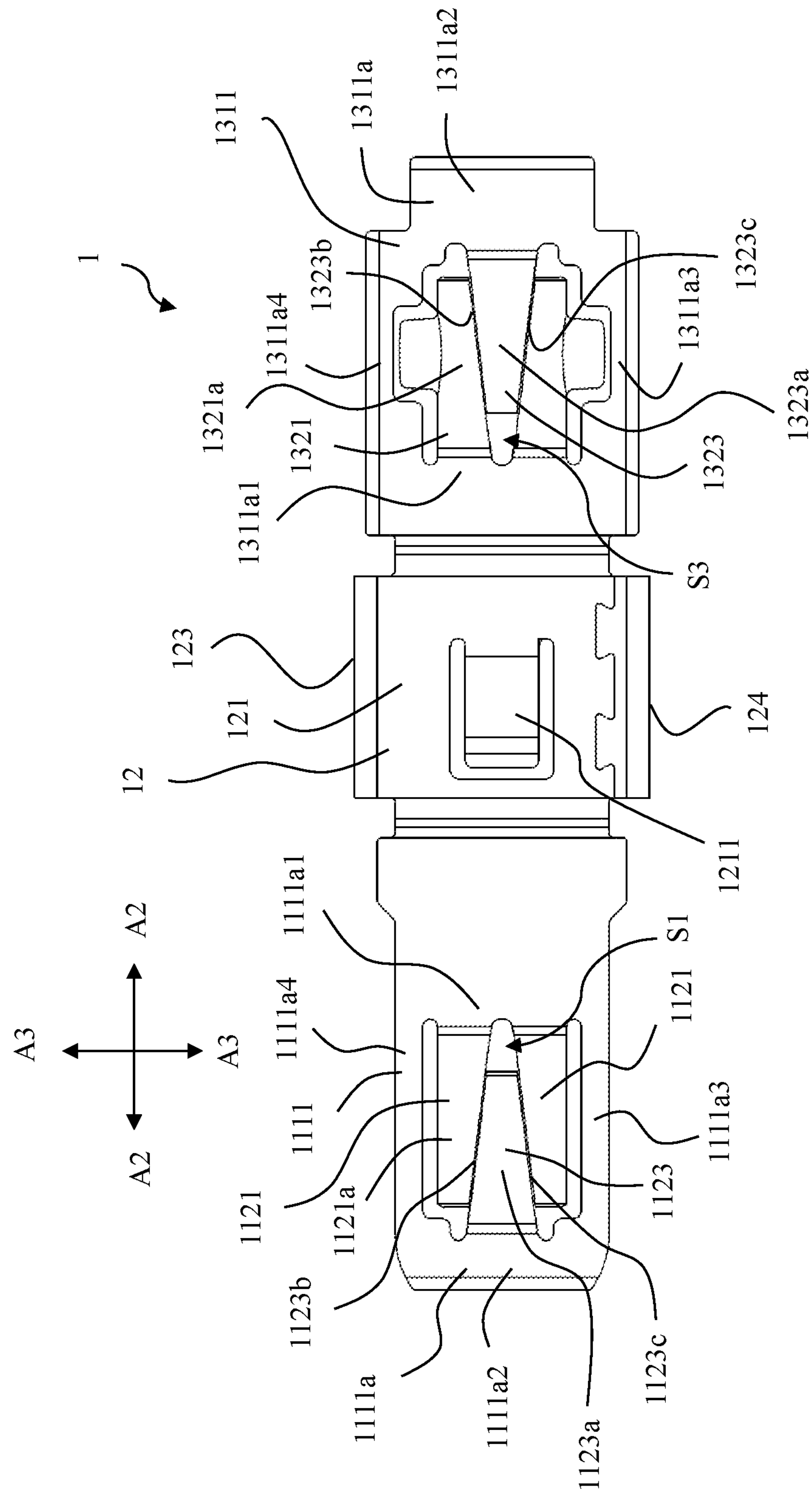
FIG. 3 is a schematic top view of the adapter terminal in FIG. 1.

Referring to FIG. 2 and FIG. 3, the first elastic piece portion 112 includes a first elastic piece 1121.

Referring to FIG. 3, the first elastic piece 1121 extends from the first base plate 1111 along the second direction A2-A2. The first elastic piece 1121 includes a first elastic contact portion 1121*a*. The first elastic contact portion 1121*a* extends and protrudes beyond the first base plate 1111 in a direction away from the second base plate 1112 along the first direction A1-A1.

Figure 7:
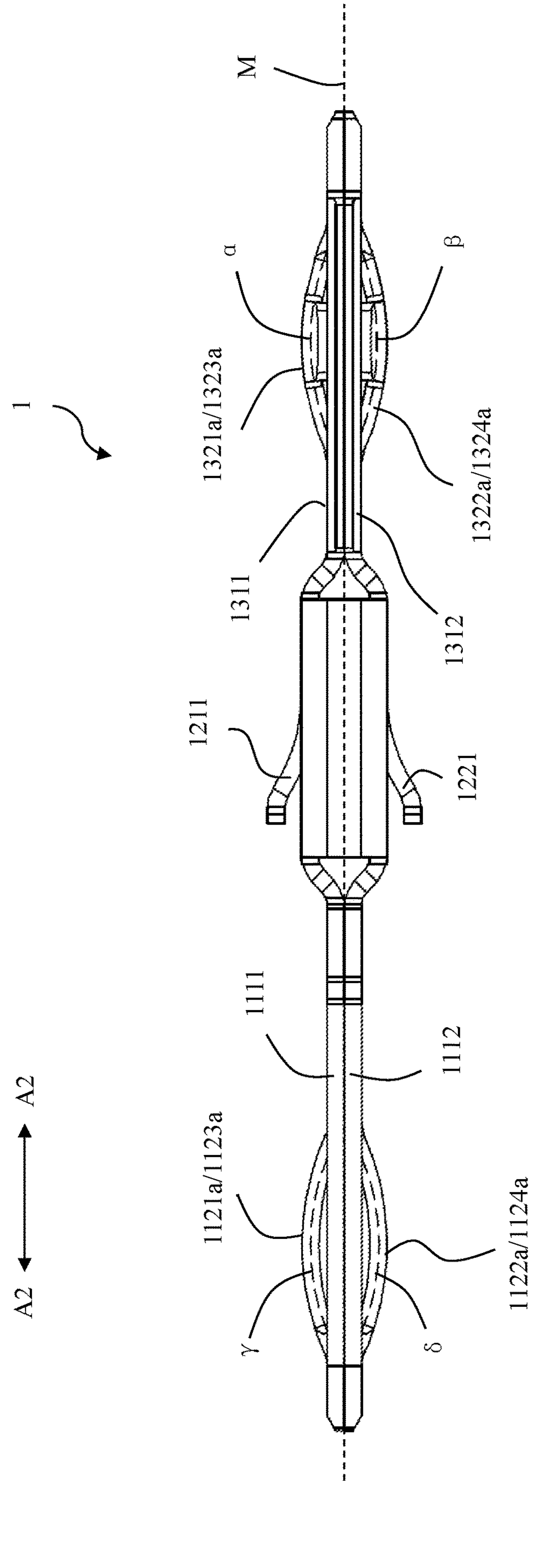
FIG. 7 is a schematic front view of the adapter terminal in FIG. 2.

Referring to FIG. 7, the first elastic contact portion 1121*a* extends along a third arc-shaped surface γ.

Referring to FIG. 3, the first base plate 1111 includes a first frame member 1111*a*. The first frame member 1111*a* includes a first wall portion 1111*a*1, a second wall portion 1111*a*2 opposite to the first wall portion 1111*a*1, a third wall portion 1111*a*3 connecting one end of the first wall portion 1111*a*1 and one end of the second wall portion 1111*a*2, and a fourth wall portion 1111*a*4 connecting another end of the first wall portion 1111*a*1 and another end of the second wall portion 1111*a*2.

The second wall portion 1111*a*2 is located at a distal end of the adapter terminal 1. In other words, the second wall portion 1111*a*2 is located at an end of the first base plate 1111 away from the fixing portion 12.

The first elastic piece 1121 extends from the first wall portion 1111*a*1 toward the second wall portion 1111*a*2. An end of the first elastic piece 1121 close to the second wall portion 1111*a*2 is its free end. When the adapter terminal 1 is mated with a conductive terminal (for example, the second conductive terminal 3), the free end of the first elastic piece 1121 can move along the first direction A1-A1 due to pressure in the first frame member 1111*a*.

Referring to FIG. 3, the first elastic piece portion 112 further includes a third elastic piece 1123.

The third elastic piece 1123 is located in the first frame member 1111*a*. The third elastic piece 1123 extends from the first base plate 1111 along the second direction A2-A2. An extending direction of the third elastic piece 1123 is opposite to an extending direction of the first elastic piece 1121. Along the third direction A3-A3, the third elastic piece 1123 and the first elastic piece 1121 at least partially overlap.

In the illustrated embodiment, two first elastic pieces 1121 are provided. Along the third direction A3-A3, a first relief space S1 is formed between the two first elastic pieces 1121. Viewed from one end of the first direction A1-A1, the first relief space S1 is roughly V-shaped. The third elastic piece 1123 extends into the first relief space S1. Correspondingly, the third elastic piece 1123 includes a first inclined side 1123*b* and a second inclined side 1123*c*.

The third elastic piece 1123 extends from the second wall portion 1111*a*2 toward the first wall portion 1111*a*1. An end of the third elastic piece 1123 close to the first wall portion 1111*a*1 is its free end. When the adapter terminal 1 is mated with the conductive terminal (for example, the second conductive terminal 3), the free end of the third elastic piece

1123 can move along the first direction A1-A1 due to pressure in the first frame member 1111*a*.

The third elastic piece 1123 includes a third elastic contact portion 1123*a*. The third elastic contact portion 1123*a* extends and protrudes beyond the first base plate 1111 in a direction away from the second base plate 1112 along the first direction A1-A1.

Referring to FIG. 7, the third elastic contact portion 1123*a* also extends along the third arc-shaped surface γ.

The first elastic piece 1121 and the third elastic piece 1123 are oppositely disposed and arranged in a staggered manner with the same arc. This enables the two to protect each other, reducing the possibility of deformation of the first elastic piece 1121 and the third elastic piece 1123 during transportation or use.

Figure 5:
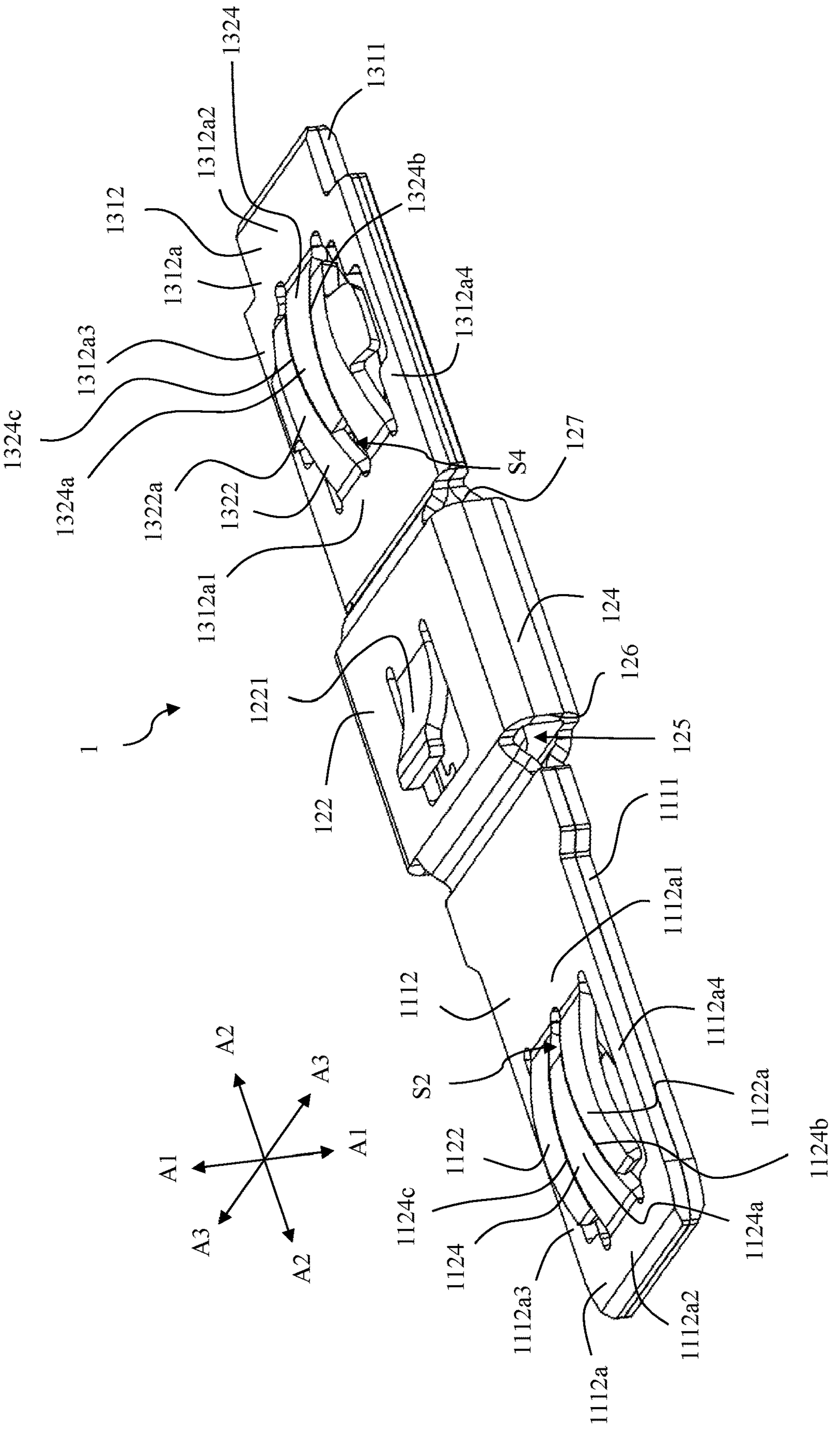
FIG. 5 is a structural schematic view of the adapter terminal from an angle.

Referring to FIG. 5, the first elastic piece portion 112 further includes a second elastic piece 1122. The second elastic piece 1122 extends from the second base plate 1112 along the second direction A2-A2. The second elastic piece 1122 includes a second elastic contact portion 1122*a*. The second elastic contact portion 1122*a* extends and protrudes beyond the second base plate 1112 in a direction away from the first base plate 1111 along the first direction A1-A1.

Referring to FIG. 7, the second elastic contact portion 1122*a* extends along a fourth arc-shaped surface δ.

Referring to FIG. 5, the second base plate 1112 includes a second frame member 1112*a*. The second frame member 1112*a* includes a fifth wall portion 1112*a*1, a sixth wall portion 1112*a*2 opposite to the fifth wall portion 1112*a*1, a seventh wall portion 1112*a*3 connecting one end of the fifth wall portion 1112*a*1 and one end of the sixth wall portion 1112*a*2, and an eighth wall portion 1112*a*4 connecting another end of the fifth wall portion 1112*a*1 and another end of the sixth wall portion 1112*a*2.

The sixth wall portion 1112*a*2 is located at the distal end of the adapter terminal 1. In other words, the sixth wall portion 1112*a*2 is located at an end of the second base plate 1112 away from the fixing portion 12.

The second elastic piece 1122 extends from the fifth wall portion 1112*a*1 toward the sixth wall portion 1112*a*2. An end of the second elastic piece 1122 close to the sixth wall portion 1112*a*2 is its free end. When the adapter terminal 1 is mated with the conductive terminal (for example, the second conductive terminal 3), the free end of the second elastic piece 1122 can move along the first direction A1-A1 due to pressure in the second frame member 1112*a*.

The first elastic piece portion 112 further includes a fourth elastic piece 1124.

The fourth elastic piece 1124 is located in the second frame member 1112*a*. The fourth elastic piece 1124 extends from the second base plate 1112 along the second direction A2-A2. An extending direction of the fourth elastic piece 1124 is opposite to an extending direction of the second elastic piece 1122.

Along the third direction A3-A3, the fourth elastic piece 1124 and the second elastic piece 1122 at least partially overlap.

In the illustrated embodiment, two second elastic pieces 1122 are provided. Along the third direction A3-A3, a second relief space S2 is formed between the two second elastic pieces 1122. Viewed from one end of the first direction A1-A1, the second relief space S2 is roughly V-shaped. The fourth elastic piece 1124 extends into the second relief space S2. Correspondingly, the fourth elastic piece 1124 includes a third inclined side 1124*b* and a fourth inclined side 1124*c*.

The fourth elastic piece 1124 extends from the sixth wall portion 1112*a*2 toward the fifth wall portion 1112*a*1. An end of the fourth elastic piece 1124 close to the fifth wall portion 1112*a*1 is its free end. When the adapter terminal 1 is mated with the conductive terminal (for example, the second conductive terminal 3), the free end of the fourth elastic piece 1124 can move along the first direction A1-A1 due to pressure in the second frame member 1112*a*.

The fourth elastic piece 1124 includes a fourth elastic contact portion 1124*a*. The fourth elastic contact portion 1124*a* extends and protrudes beyond the second base plate 1112 in a direction away from the first base plate 1111 along the first direction A1-A1.

Referring to FIG. 7, the fourth elastic contact portion 1124*a* also extends along the fourth arc-shaped surface δ.

The second elastic piece 1122 and the fourth elastic piece 1124 are disposed oppositely and arranged in a staggered manner with the same arc. This allows the two to protect each other, reducing the possibility of deformation during transportation or use.

Referring to FIG. 2, the second mating portion 13 includes a second base portion 131 and a second elastic piece portion 132. The second elastic piece portion 132 is configured to at least partially protrude beyond the second base portion 131. When the adapter terminal 1 is mated with the first conductive terminal 2, the second elastic piece portion 132 will abut against the first conductive terminal 2 for connection.

Referring to FIG. 2, FIG. 3 and FIG. 5, the second base portion 131 includes a third base plate 1311 and a fourth base plate 1312 which are disposed side by side along the first direction A1-A1. Along the second direction A2-A2, both the third base plate 1311 and the fourth base plate 1312 are connected to another end of the fixing portion 12.

Referring to FIG. 2 and FIG. 3, the second elastic piece portion 132 includes a fifth elastic piece 1321.

The fifth elastic piece 1321 extends from the third base plate 1311 along the second direction A2-A2. The fifth elastic piece 1321 includes a fifth elastic contact portion 1321*a*. The fifth elastic contact portion 1321*a* extends and protrudes beyond the third base plate 1311 in a direction away from the fourth base plate 1312 along the first direction A1-A1.

Referring to FIG. 7, the fifth elastic contact portion 1321*a* extends along a first arc-shaped surface α.

Figure 4:
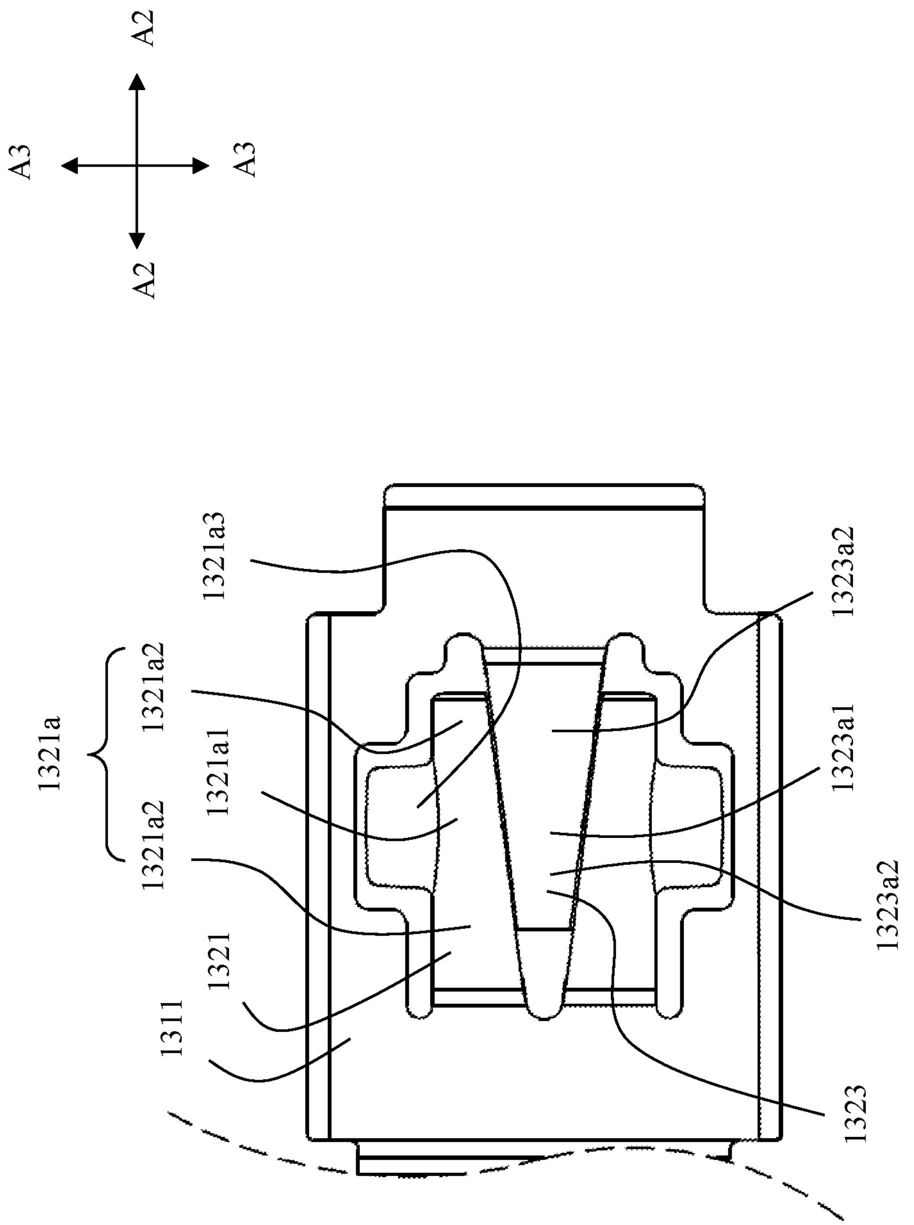
FIG. 4 is an enlarged schematic view of a second mating portion in FIG. 3.

Further, referring to FIG. 4, the fifth elastic contact portion 1321*a* includes a first abutting portion 1321*a*1 and a first guide segment 1321*a*2.

The first abutting portion 1321*a*1 is configured to abut against a mated conductive terminal (for example, the first conductive terminal 2).

Along the second direction A2-A2, the first guide segment 1321*a*2 is located on one side or two sides of the first abutting portion 1321*a*1. When the first guide segment 1321*a*2 is located on one side of the first abutting portion 1321*a*1, the first guide segment 1321*a*2 is located on a side of the first abutting portion 1321*a*1 close to the distal end of the adapter terminal 1.

The first guide segment 1321*a*2 smoothly extends from the first abutting portion 1321*a*1 toward the third base plate 1311 along the first arc-shaped surface α.

The second elastic piece portion 132 further includes a first guide piece 1321*a*3. Along the third direction A3-A3, the first guide piece 1321*a*3 is located on a side of the fifth elastic contact portion 1321*a* close to the third base plate 1311.

The first guide piece **1321*a*3 smoothly extends from the first abutting portion 1321*a*1 toward the third base plate 1311** along an arcuate surface or a spherical surface.

Referring to FIG. 3, the third base plate 1311 includes a third frame member **1311*a*. The third frame member 1311*a* includes a ninth wall portion 1311*a*1, a tenth wall portion 1311*a*2 opposite to the ninth wall portion 1311*a*1, an eleventh wall portion 1311*a*3 connecting one end of the ninth wall portion 1311*a*1 and one end of the tenth wall portion 1311*a*2, and a twelfth wall portion 1311*a*4 connecting another end of the ninth wall portion 1311*a*1 and another end of the tenth wall portion 1311*a*2**.

The tenth wall portion **1311*a*2 is located at the distal end of the adapter terminal 1. In other words, the tenth wall portion 1311*a*2 is located at an end of the third base plate 1311 away from the fixing portion 12**.

The fifth elastic piece 1321 extends from the ninth wall portion **1311*a*1 toward the tenth wall portion 1311*a*2. An end of the fifth elastic piece 1321 close to the tenth wall portion 1311*a*2 is its free end. When the adapter terminal 1 is mated with the conductive terminal (for example, the first conductive terminal 2), the free end of the fifth elastic piece 1321 can move along the first direction A1-A1 due to pressure in the third frame member 1311*a***.

Referring to FIG. 3, the second elastic piece portion 132 further includes a seventh elastic piece 1323. The seventh elastic piece 1323 is located in the third frame member **1311*a*. The seventh elastic piece 1323 extends from the third base plate 1311 along the second direction A2-A2. An extending direction of the seventh elastic piece 1323 is opposite to an extending direction of the fifth elastic piece 1321. Along the third direction A3-A3, the seventh elastic piece 1323 and the fifth elastic piece 1321** at least partially overlap.

In the illustrated embodiment, two fifth elastic pieces 1321 are provided. Along the third direction A3-A3, a third relief space S3 is formed between the two fifth elastic pieces 1321. Viewed from one end of the first direction A1-A1, the third relief space S3 is roughly V-shaped. The seventh elastic piece 1323 extends into the third relief space S3. Correspondingly, the seventh elastic piece 1323 includes a fifth inclined side **1323*b* and a sixth inclined side 1323*c***.

The seventh elastic piece 1323 extends from the tenth wall portion **1311*a*2 to the ninth wall portion 1311*a*1. An end of the seventh elastic piece 1323 close to the ninth wall portion 1311*a*1 is its free end. When the adapter terminal 1 is mated with the conductive terminal (for example, the first conductive terminal 2), the free end of the seventh elastic piece 1323 can move along the first direction A1-A1 due to pressure in the third frame member 1311*a***.

The seventh elastic piece 1323 includes a seventh elastic contact portion **1323*a*. The seventh elastic contact portion 1323*a* extends and protrudes beyond the third base plate 1311 in a direction away from the fourth base plate 1312** along the first direction A1-A1.

Referring to FIG. 7, the seventh elastic contact portion **1323*a*** extends along the first arc-shaped surface α.

Referring to FIG. 4, the seven elastic contact portions **1323*a* include a third abutting portion 1323*a*1 and a third guide segment 1323*a*2**.

The third abutting portion **1323*a*1 is configured to abut against a mated conductive terminal (for example, the first conductive terminal 2**).

Along the second direction A2-A2, the third guide segment **1323*a*2 is located on one side or two sides of the third abutting portion 1323*a*1. When the third guide segment 1323*a*2 is located on one side of the third abutting portion 1323*a*1, the third guide segment 1323*a*2 is located on a side of the third abutting portion 1323*a*1 close to the distal end of the adapter terminal 1**.

The third guide segment **1323*a*2 smoothly extends from the third abutting portion 1323*a*1 toward the third base plate 1311** along the first arc-shaped surface α.

The fifth elastic piece 1321 and the seventh elastic piece 1323 are disposed oppositely and arranged in a staggered manner with the same arc. This enables the two to protect each other, reducing the possibility of deformation of the fifth elastic piece 1321 and the seventh elastic piece 1323 during transportation or use.

Referring to FIG. 5, the second elastic piece portion 132 further includes a sixth elastic piece 1322. The sixth elastic piece 1322 extends from the fourth base plate 1312 along the second direction A2-A2. The sixth elastic piece 1322 includes a sixth elastic contact portion **1322*a*. The sixth elastic contact portion 1322*a* extends and protrudes beyond the fourth base plate 1312 in a direction away from the third base plate 1311** along the first direction A1-A1.

Referring to FIG. 7, the sixth elastic contact portion **1322*a*** extends along a second arc-shaped surface β.

Figure 6:
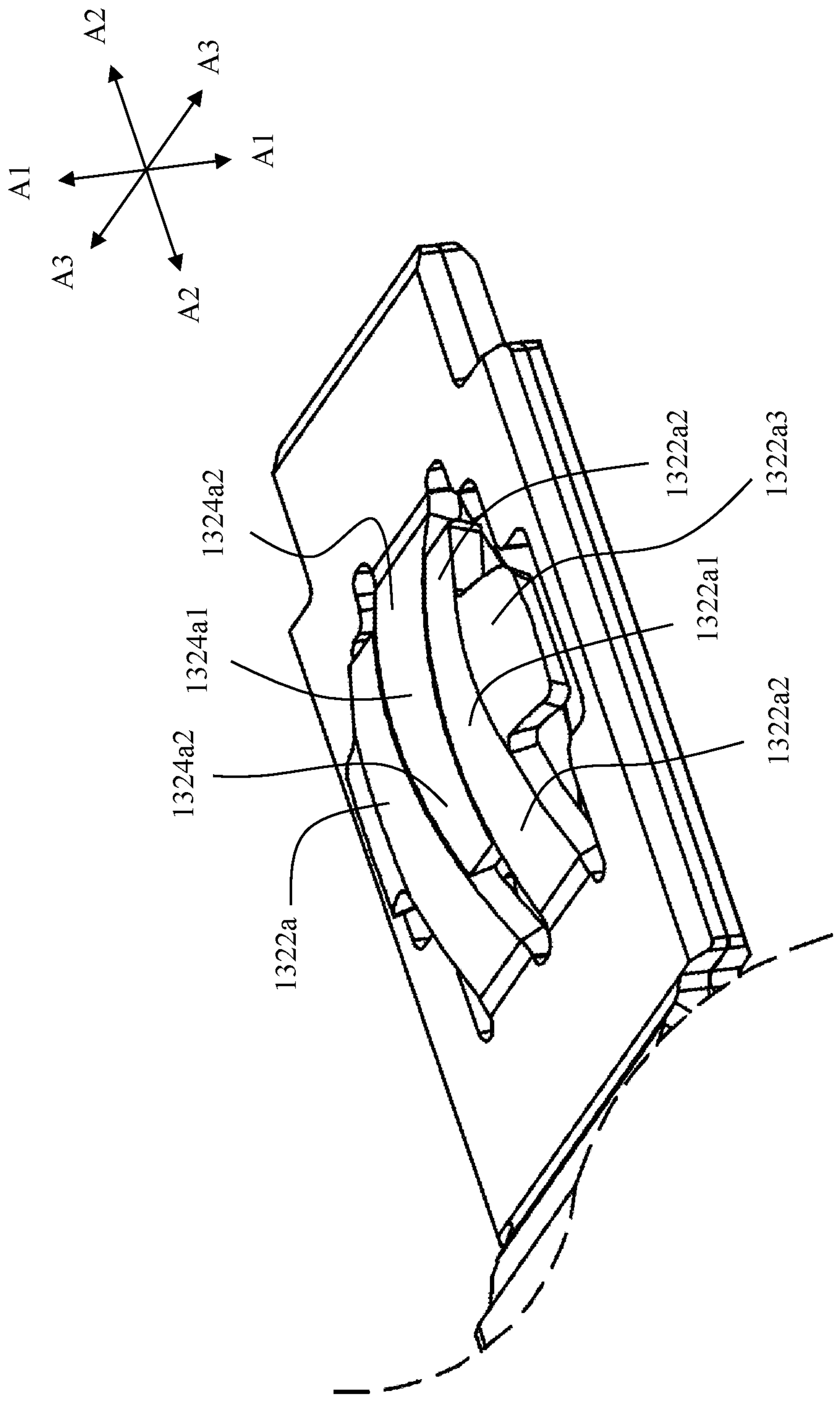
FIG. 6 is an enlarged schematic view of a second mating portion in FIG. 5.

Further, referring to FIG. 6, the sixth elastic contact portion **1322*a* includes a second abutting portion 1322*a*1 and a second guide segment 1322*a*2**.

The second abutting portion **1322*a*1 is configured to abut against a mated conductive terminal (for example, the first conductive terminal 2**).

Along the second direction A2-A2, the second guide segment **1322*a*2 is located on one side or two sides of the second abutting portion 1322*a*1. When the second guide segment 1322*a*2 is located on one side of the second abutting portion 1322*a*1, the second guide segment 1322*a*2 is located on a side of the second abutting portion 1322*a*1 close to the distal end of the adapter terminal 1**.

The second guide segment **1322*a*2 smoothly extends from the second abutting portion 1322*a*1 toward the fourth base plate 1312** along the second arc-shaped surface β.

The second elastic piece portion 132 further includes a second guide piece **1322*a*3. Along the third direction A3-A3, the second guide piece 1322*a*3 is located on a side of the sixth elastic contact portion 1322*a* close to the fourth base plate 1312. The second guide piece 1322*a*3 smoothly extends from the second abutting portion 1322*a*1 toward the fourth base plate 1312** along an arcuate surface or a spherical surface.

Referring to FIG. 5, the fourth base plate 1312 includes a fourth frame member **1312*a*. The fourth frame member 1312*a* includes a thirteenth wall portion 1312*a*1, a fourteenth wall portion 1312*a*2 opposite to the thirteenth wall portion 1312*a*1, a fifteenth wall portion 1312*a*3 connecting one end of the thirteenth wall portion 1312*a*1 and one end of the fourteenth wall portion 1312*a*2, and a sixteenth wall portion 1312*a*4 connecting another end of the thirteenth wall portion 1312*a*1 and another end of the fourteenth wall portion 1312*a*2**.

The fourteenth wall portion **1312*a*2 is located at the distal end of the adapter terminal 1. In other words, the fourteenth wall portion 1312*a*2 is located at an end of the fourth base plate 1312 away from the fixing portion 12**.

The sixth elastic piece 1322 extends from the thirteenth wall portion **1312*a*1 to the fourteenth wall portion 1312*a*2. An end of the sixth elastic piece 1322 close to the fourteenth wall portion 1312*a*2 is its free end. When the adapter terminal 1 is mated with the conductive terminal (for example, the first conductive terminal 2), the free end of the sixth elastic piece 1322 can move along the first direction A1-A1 due to pressure in the fourth frame member 1312***a*.

Referring to FIG. 5, the second elastic piece portion 132 further includes an eighth elastic piece 1324.

The eighth elastic piece 1324 is located in the fourth frame member 1312*a*. The eighth elastic piece 1324 extends from the fourth base plate 1312 along the second direction A2-A2. An extending direction of the eighth elastic piece 1324 is opposite to an extending direction of the sixth elastic piece 1322.

Along the third direction A3-A3, the eighth elastic piece 1324 and the sixth elastic piece 1322 at least partially overlap.

In the illustrated embodiment, two sixth elastic pieces 1322 are provided. Along the third direction A3-A3, a fourth relief space S4 is formed between the two sixth elastic pieces 1322. Viewed from one end of the first direction A1-A1, the fourth relief space S4 is roughly V-shaped. The eighth elastic piece 1324 extends into the fourth relief space S4. Correspondingly, the eighth elastic piece 1324 includes a seventh inclined side 1324*b* and an eighth inclined side 1324*c*.

The eighth elastic piece 1324 extends from the fourteenth wall portion 1312*a*2 to the thirteenth wall portion 1312*a*1. An end of the eighth elastic piece 1324 close to the thirteenth wall portion 1312*a*1 is its free end. When the adapter terminal 1 is mated with the conductive terminal (for example, the first conductive terminal 2), the free end of the eighth elastic piece 1324 can move along the first direction A1-A1 due to pressure in the fourth frame member 1312*a*.

The eighth elastic piece 1324 includes an eighth elastic contact portion 1324*a*. The eighth elastic contact portion 1324*a* extends and protrudes from the fourth base plate 1312 in a direction away from the third base plate 1311 along the first direction A1-A1.

Referring to FIG. 7, the eighth elastic contact portion 1324*a* extends along the second arc-shaped surface β.

Referring to FIG. 6, the eighth elastic contact portion 1324*a* includes a fourth abutting portion 1324*a*1 and a fourth guide segment 1324*a*2.

The fourth abutting portion 1324*a*1 is configured to abut against a mated conductive terminal (for example, the first conductive terminal 2).

Along the second direction A2-A2, the fourth guide segment 1324*a*2 is located on one side or two sides of the fourth abutting portion 1324*a*1. When the fourth guide segment 1324*a*2 is located on one side of the fourth abutting portion 1324*a*1, the fourth guide segment 1324*a*2 is located on a side of the fourth abutting portion 1324*a*1 close to the distal end of the adapter terminal 1.

The fourth guide segment 1324*a*2 smoothly extends from the fourth abutting portion 1324*a*1 toward the fourth base plate 1312 along the second arc-shaped surface β.

The sixth elastic piece 1322 and the eighth elastic piece 1324 are disposed oppositely and arranged in a staggered manner with the same arc. This allows the two to protect each other, reducing the possibility of deformation during transportation or use.

Referring to FIG. 4 and FIG. 6, the first guide segment 1321*a*2, the second guide segment 1322*a*2, the third guide segment 1323*a*2 and the fourth guide segment 1324*a*2 are a first guide portion 1326 of the second mating portion 13. The first guide piece 1321*a*3 and the second guide piece 1322*a*3 are a second guide portion 1327 of the second mating portion 13. The first abutting portion 1321*a*1, the second abutting portion 1322*a*1, the third abutting portion 1323*a*1 and the fourth abutting portion 1324*a*1 are an abutting portion 1325 of the second mating portion 13.

Both the first elastic contact portion 1121*a* and the third elastic contact portion 1123*a* extend along the third arc-shaped surface γ. Both the second elastic contact portion 1122*a* and the fourth elastic contact portion 1124*a* extend along the fourth arc-shaped surface δ. Both the fifth elastic contact portion 1321*a* and the seventh elastic contact portion 1323*a* extend along the first arc-shaped surface α. Both the sixth elastic contact portion 1322*a* and the eighth elastic contact portion 1324*a* extend along the second arc-shaped surface β. Compared with a form that the elastic contact portions are set to extend along a spherical surface, the form extending along the arc-shaped surface in the illustrated embodiment makes the contact between the elastic contact portions and a conductive terminal (for example, the first conductive terminal 2 or the second conductive terminal 3) has a larger contact area and is more suitable for conducting large currents.

Referring to FIG. 3 and FIG. 5, the fixing portion 12 includes a first fixing wall 121, a second fixing wall 122 opposite to the first fixing wall 121, a first connecting wall 123 connecting one end of the first fixing wall 121 and one end of the second fixing wall 122, and a second connecting wall 124 connecting another end of the first fixing wall 121 and another end of the second fixing wall 122.

Along the second direction A2-A2, one end of the first fixing wall 121 is connected to the first base plate 1111, and the other end of the first fixing wall 121 is connected to the third base plate 1311. One end of the second fixing wall 122 is connected to the second base plate 1112, and the other end of the second fixing wall 122 is connected to the fourth base plate 1312.

Along the first direction A1-A1, the first fixing wall 121 and the second fixing wall 122 are separated by a certain distance. This makes the fixing portion 12 more three-dimensional and easy to be fixed inside the connector (for example, to be fixed to the insulating body of the connector).

In other words, referring to FIG. 5, along the second direction A2-A2, the fixing portion 12 includes a first end surface 126 and a second end surface 127 opposite to the first end surface 126. The fixing portion 12 further defines a cavity 125. The cavity 125 extends through the first end surface 126 and the second end surface 127 along the second direction A2-A2.

Referring to FIG. 3, the first fixing wall 121 includes a first positioning protrusion 1211. The first positioning protrusion 1211 protrudes away from the second fixing wall 122 from the first fixing wall 121. Referring to FIG. 5, the second fixing wall 122 includes a second positioning protrusion 1221. The second positioning protrusion 1221 protrudes from the second fixing wall 122 in a direction away from the first fixing wall 121.

Referring to FIG. 7, there is a plane M between the third base plate 1311 and the fourth base plate 1312, and the adapter terminal 1 is symmetrical about the plane M.

The adapter terminal 1 described in the present disclosure can be integrally formed by multiple times of stamping. The material of the adapter terminal 1 may be copper alloy. Referring to FIG. 2, the adapter terminal 1 realizes the connection with the second conductive terminal 3 through a flat first base portion 111 and a first elastic piece portion 112 protruding outwardly from the first base portion 111. The adapter terminal 1 realizes the connection with the first conductive terminal 2 through the flat second base portion 131 and the second elastic piece portion 132 protruding outwardly from the second base portion 131, and has a simple structure. In addition, referring to FIG. 2 and FIG. 7, the entire adapter terminal 1 can be deployed roughly along the plane M (see FIG. 2, the fixing portion 12 is deployed along a zigzag fitting line A4). Through the unfolding of the adapter terminal 1, those skilled in the art can easily know the whole process of stamping the adapter terminal 1. The adapter terminal 1 can be obtained by stamping multiple times, which makes the manufacturing process of the adapter terminal 1 simple and the manufacturing cost is low.

Figure 8:
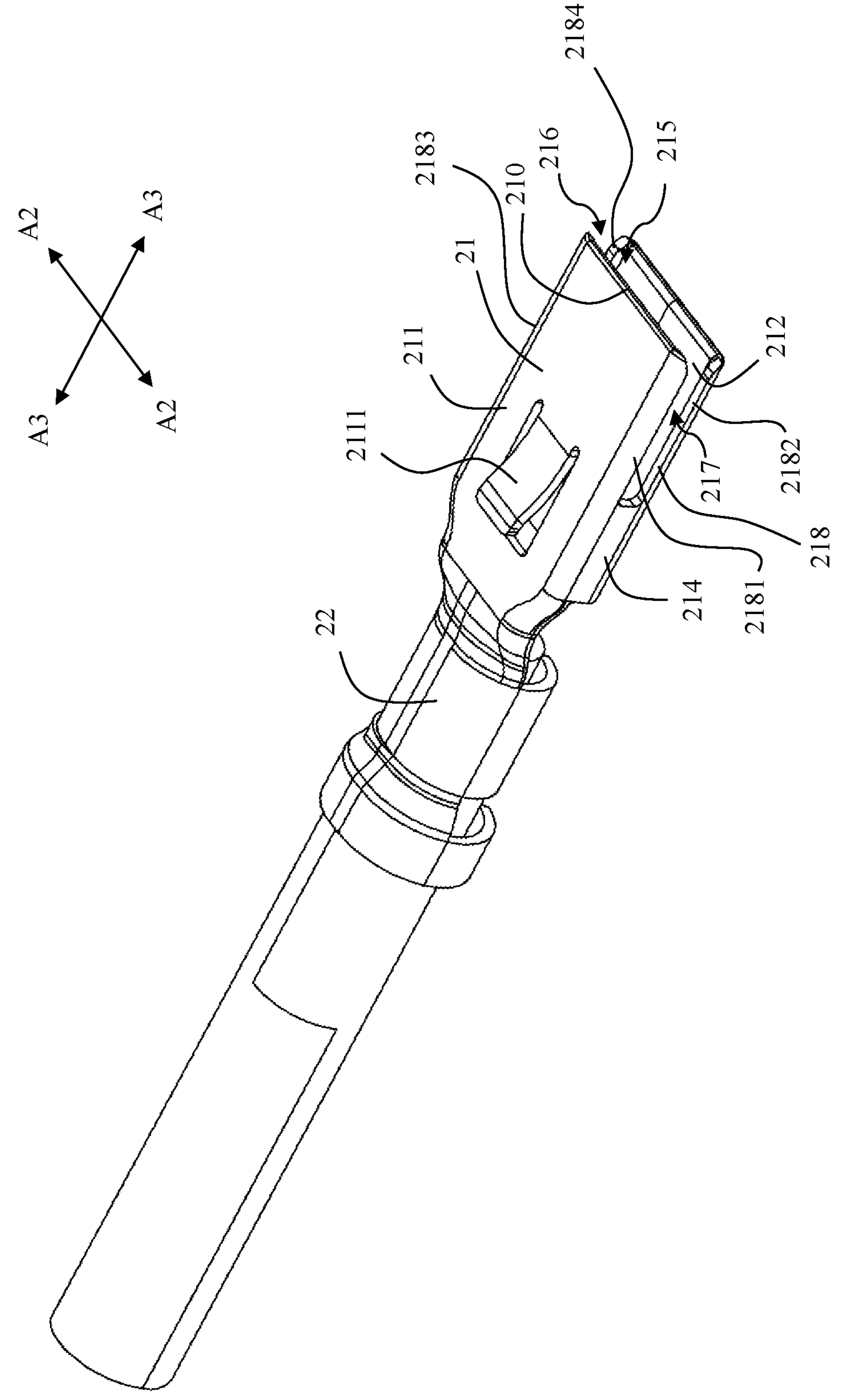
FIG. 8 is a structural schematic view of the first conductive terminal in FIG. 2 from another angle.

Referring to FIG. 2 and FIG. 8, the first conductive terminal 2 includes a first socket portion 21 and a first connection portion 22 connected to the first socket portion 21.

The first socket portion 21 includes a first abutting wall 211, a second abutting wall 212 opposite to the first abutting wall 211, a third connecting wall 213 connecting one end of the first abutting wall 211 and one end of the second abutting wall 212, and a fourth connecting wall 214 connecting another end of the first abutting wall 211 and another end of the second abutting wall 212.

Referring to FIG. 8, the first socket portion 21 has a first mating end surface 210 and a first mating space 215. The first mating space 215 extends through the first mating end surface 210 along its extending direction (i.e., the third direction A3-A3 in the drawings). The first abutting wall 211, the second abutting wall 212, the third connecting wall 213 and the fourth connecting wall 214 surround the first mating space 215.

The first socket portion 21 further defines a first avoidance groove 216 and a second avoidance groove 217. The first avoidance groove 216 extends through the third connecting wall 213 along a direction perpendicular to the third connecting wall 213. The first avoidance groove 216 extends along the third direction A3-A3 and extends through the first mating end surface 210. The second avoidance groove 217 extends through the fourth connecting wall 214 along a direction perpendicular to the fourth connecting wall 214. The second avoidance groove 217 extends along the third direction A3-A3 and extends through the first mating end surface 210.

In the illustrated embodiment, the first conductive terminal 2 is inserted into the adapter terminal 1 along the third direction A3-A3. The first avoidance groove 216 and the second avoidance groove 217 avoid the second base portion 131. After being inserted, the first abutting wall 211 and the second abutting wall 212 are pressed against an outside of the second elastic piece portion 132 so as to realize electrical connection with the adapter terminal 1.

Referring to FIG. 2 and FIG. 8, in the illustrated embodiment, the first socket portion 21 further includes a first edge 2181, a second edge 2182, a third edge 2183 and a fourth edge 2184.

The first edge 2181 extends from one side of the first abutting wall 211 toward one side of the second abutting wall 212. Correspondingly, the second edge 2182 extends from the one side of the second abutting wall 212 toward the one side of the first abutting wall 211. The third edge 2183 extends from another side of the first abutting wall 211 toward another side of the second abutting wall 212. Correspondingly, the fourth edge 2184 extends from the another side of the second abutting wall 212 toward the another side of the first abutting wall 211.

The first edge 2181, the second edge 2182, the third edge 2183 and the fourth edge 2184 constitute a first edge portion 218 of the first socket portion 21. When the first socket portion 21 is mated with the adapter terminal 1 along the third direction A3-A3, the first edge portion 218 can provide a guide. In addition, the first edge portion 218 can also form a position constraint on the adapter terminal 1 located in the first mating space 215.

Referring to FIG. 2, the first conductive terminal 2 is mated with the adapter terminal 1 at 900 along the third direction A3-A3. During mating, the first edge portion 218 of the first conductive terminal 2 and the second guide portion 1327 of the adapter terminal 1 provide guidance.

Figure 11:
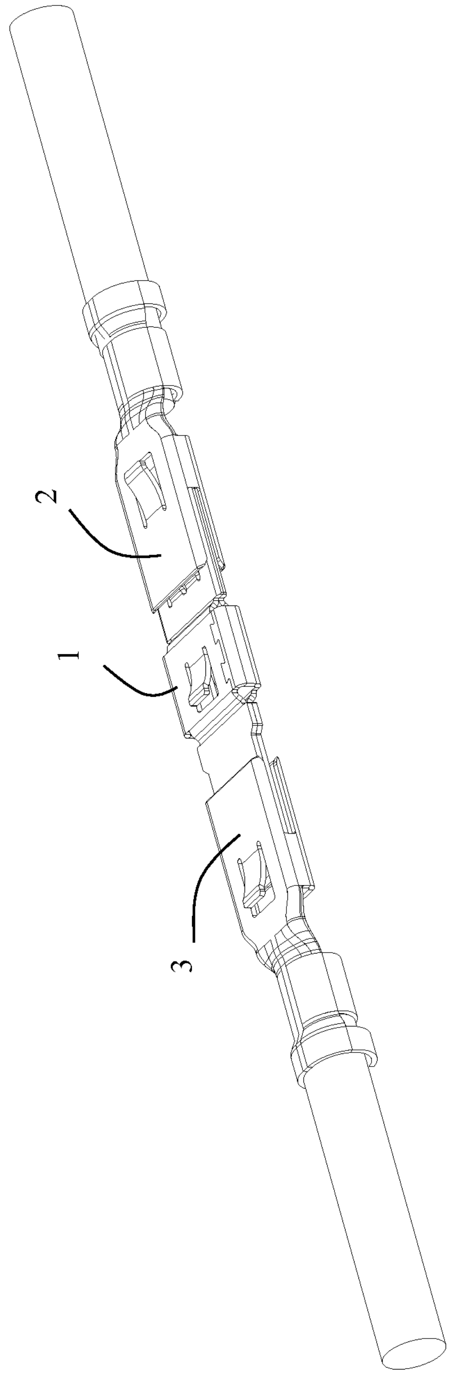
FIG. 11 is a schematic structural view of the first conductive terminal, the adapter terminal and the second conductive terminal (related cables are also shown) in accordance with a second embodiment of the connector assembly of the present disclosure.

In other embodiments of the present disclosure, such as the second embodiment shown in FIG. 11, the first conductive terminal 2 and the transition terminal 1 are mated with each other along the second direction A2-A2.

At this time, the first edge portion 218 of the first conductive terminal 2 and the first guide portion 1326 of the adapter terminal 1 provide guidance.

Figure 12:
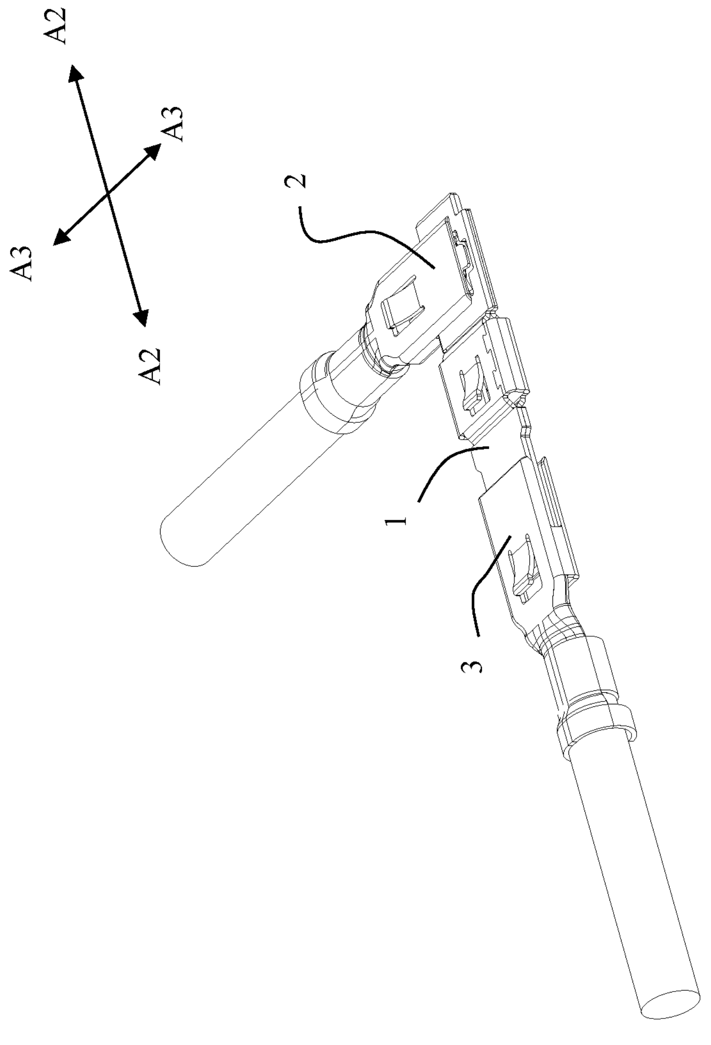
FIG. 12 is a schematic structural view of the first conductive terminal, the adapter terminal and the second conductive terminal (related cables are also shown) in accordance with a third embodiment of the connector assembly of the present disclosure.

In the third embodiment of the present disclosure, as shown in FIG. 12, the first conductive terminal 2 is mated with the adapter terminal 1 along the third direction A3-A3 at 270°. At this time, the first edge portion 218 of the first conductive terminal 2 is guided by the second guide portion 1327. It can be seen from the foregoing description that the setting of the first guide portion 1326 and the second guide portion 1327 makes it possible for the adapter terminal 1 to be inserted into a corresponding conductive terminal (such as the first conductive terminal 2) at multiple angles (90°, 180° or 270°). This advantage is especially important in vehicles and other occasions where high current needs to be transmitted, and sockets and plugs often need to be assembled at right angles.

Referring to FIG. 8, the first abutting wall 211 includes a third positioning protrusion 2111. The third positioning protrusion 2111 protrudes from the first abutting wall 211 in a direction away from the second abutting wall 212. The third positioning protrusion 2111 makes it easy for the first socket portion 21 to abut or engage with the connector for positioning.

In use, the first conductive terminal 2 and the transition terminal 1 are assembled to the connector.

Figure 9:
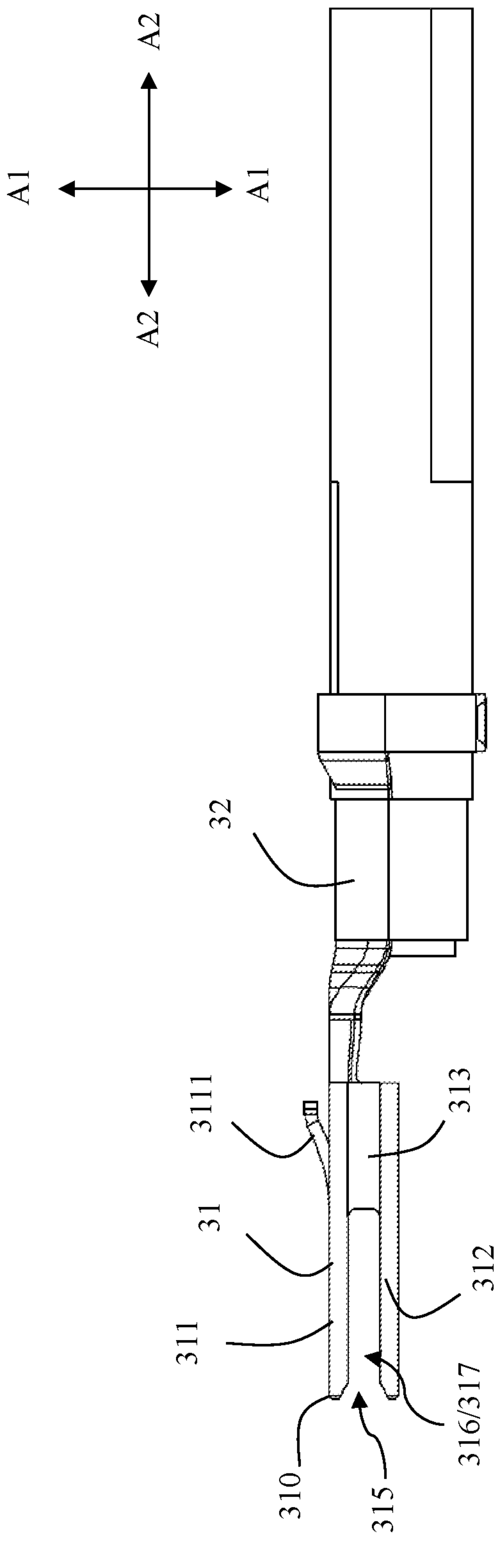
FIG. 9 is a schematic rear view of the second conductive terminal in FIG. 2.
Figure 10:
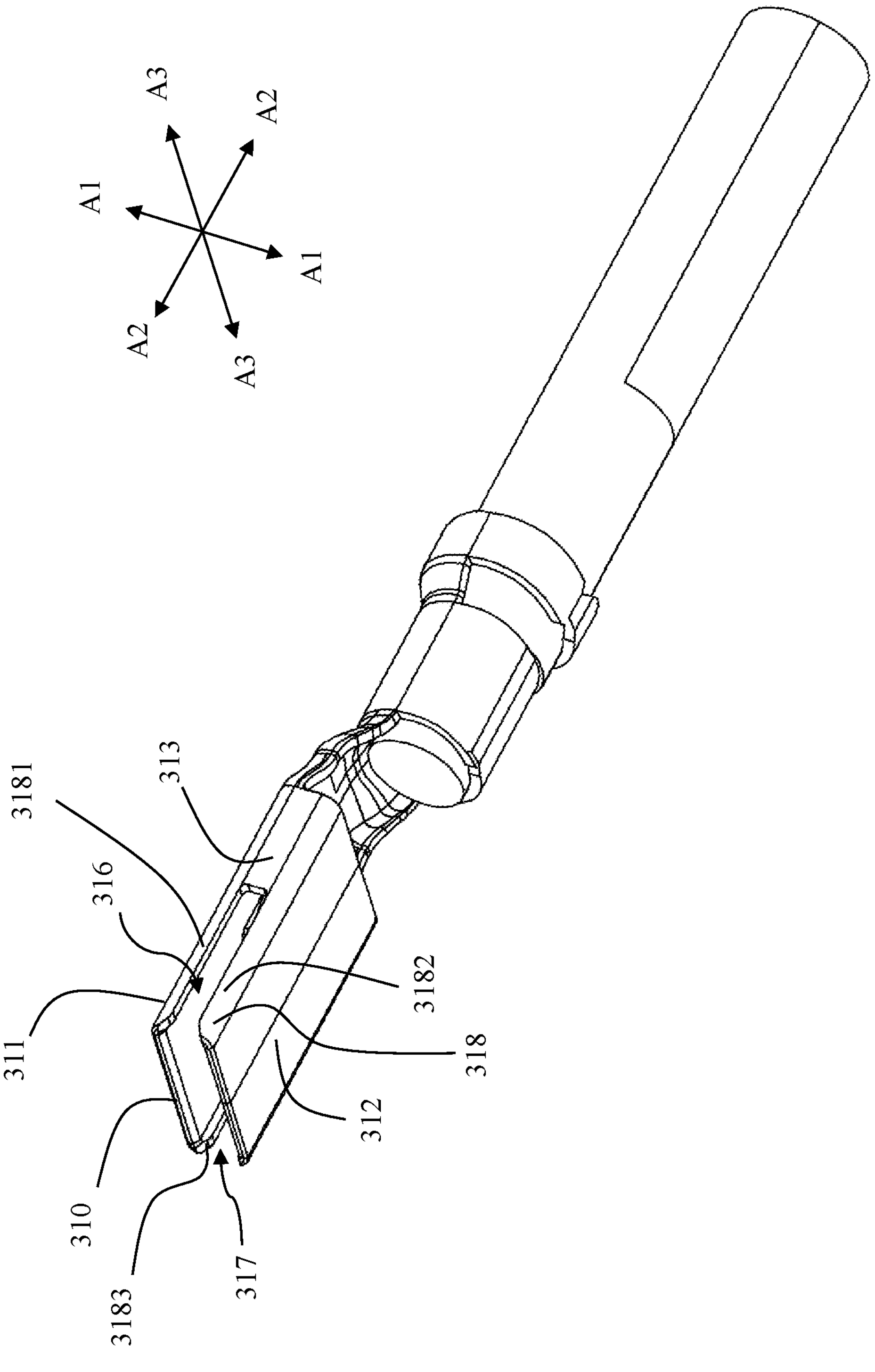
FIG. 10 is a structural schematic view of the second conductive terminal in FIG. 2 from another angle.

Referring to FIG. 2, FIG. 9 and FIG. 10, the second conductive terminal 3 includes a second socket portion 31 and a second connection portion 32 connected to the second socket portion 31.

The second socket portion 31 includes a third abutting wall 311, a fourth abutting wall 312 opposite to the third abutting wall 311, a fifth connecting wall 313 connecting one end of the third abutting wall 311 and one end of the fourth abutting wall 312, and a sixth connecting wall 314 connecting another end of the third abutting wall 311 and another end of the fourth abutting wall 312.

The second socket portion 31 has a second mating end surface 310 and a second mating space 315. The second mating space 315 extends through the second mating end surface 310 along its extending direction (i.e., the second direction A2-A2 in the drawings). The third abutting wall 311, the fourth abutting wall 312, the fifth connecting wall 313 and the sixth connecting wall 314 surround the second mating space 315.

The second socket portion 31 further defines a third avoidance groove 316 and a fourth avoidance groove 317. The third avoidance groove 316 extends through the fifth connecting wall 313 along a direction perpendicular to the fifth connecting wall 313. The third avoidance groove 316 extends along the second direction A2-A2 and extends through the second mating end surface 310. The fourth avoidance groove 317 extends through the sixth connecting wall 314 along a direction perpendicular to the sixth connecting wall 314. The fourth avoidance groove 317 extends along the second direction A2-A2 and extends through the second mating end surface 310.

Referring to FIG. 2 and FIG. 10, in the illustrated embodiment, the second conductive terminal 3 is inserted into the adapter terminal 1 along the second direction A2-A2. After being inserted, the third abutting wall 311 and the fourth abutting wall 312 are pressed against an outside of the first elastic piece portion 112 so as to realize electrical connection with the adapter terminal 1.

Referring to FIG. 2 and FIG. 10, in the illustrated embodiment, the second socket portion 31 further includes a fifth edge 3181, a sixth edge 3182, a seventh edge 3183 and an eighth edge 3184.

The fifth edge 3181 extends from one side of the third abutting wall 311 toward one side of the fourth abutting wall 312. Correspondingly, the sixth edge 3182 extends from the one side of the fourth abutting wall 312 toward the one side of the third abutting wall 311. The seventh edge 3183 extends from another side of the third abutting wall 311 toward another side of the fourth abutting wall 312. Correspondingly, the eighth edge 3184 extends from the another side of the fourth abutting wall 312 toward the another side of the third abutting wall 311.

The fifth edge 3181, the sixth edge 3182, the seventh edge 3183 and the eighth edge 3184 constitute a second edge portion 318 of the second socket portion 31.

When the second socket portion 31 is mated with the adapter terminal 1 in a direction perpendicular to the second mating end surface 310 (i.e., the second direction A2-A2 in the drawings), the second edge portion 318 can provide guidance. In addition, the second edge portion 318 can also form a position constraint on the adapter terminal 1 located in the second mating space 315.

Referring to FIG. 9, the third abutting wall 311 includes a fourth positioning protrusion 3111. The fourth positioning protrusion 3111 extends and protrudes beyond the third abutting wall 311 in a direction away from the fourth abutting wall 312.

The fourth positioning protrusion 3111 makes it easy for the second socket portion 31 to abut or engage with the mating connector.

It can be known from the foregoing description that the structures of the first conductive terminal 2 and the second conductive terminal 3 are relatively simple and easy to manufacture. The adapter terminal 1 is plugged into the first conductive terminal 2 and the second conductive terminal 3, respectively, and the connection method is relatively simple. In addition, the first conductive terminal 2 and the adapter terminal 1 can realize multi-angle insertion (for example, 90°, 180° or 270°), which makes it easy to connect the corresponding connector and the mating connector at different angles.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An adapter terminal, comprising:

a fixing portion;

a first mating portion, the first mating portion being connected with the fixing portion; the first mating portion being configured to be mated with a conductive terminal of a connector; the first mating portion comprising a first base portion and a first elastic piece portion at least partially protruding from the first base portion; and a second mating portion, the second mating portion being connected with the fixing portion;

the second mating portion being configured to be mated with a conductive terminal of a mating connector; the second mating portion comprising a second base portion and a second elastic piece portion at least partially protruding from the second base portion;

wherein the second elastic piece portion comprises an abutting portion;

wherein the second base portion comprises a third base plate and a fourth base plate;

the third base plate is connected to one end of the fixing portion along a second direction;

the fourth base plate is connected to the one end of the fixing portion along the second direction; the third base plate and the fourth base plate are disposed side by side along a first direction;

the second elastic piece portion comprises a fifth elastic piece and a sixth elastic piece;

the abutting portion comprises a first abutting portion and a second abutting portion;

the fifth elastic piece is connected to the third base plate, and the fifth elastic piece comprises the first abutting portion; the first abutting portion protrudes beyond the third base plate along the first direction and in a direction away from the fourth base plate;

the sixth elastic piece is connected to the fourth base plate; the sixth elastic piece comprises the second abutting portion; the second contact portion protrudes beyond the fourth base plate along the first direction and in a direction away from the third base plate;

the second direction is perpendicular to the first direction.

2. The adapter terminal according to claim 1, wherein the second elastic piece portion comprises a first guide portion and a second guide portion;

the first guide portion and the second guide portion smoothly extend from the abutting portion toward the second base portion along different mating directions.

3. The adapter terminal according to claim 2, wherein the first guide portion comprises a first guide segment and a second guide segment;

the second guide portion comprises a first guide piece and a second guide piece;

the fifth elastic piece extends along the second direction; the fifth elastic piece comprises the first guide segment; along the second direction, the first guide segment is located on one side or two sides of the first abutting portion;

along the third direction, the first guide piece is connected to a side of the first abutting portion adjacent to the third base plate;

the sixth elastic piece extends along the second direction; the sixth elastic piece comprises the second guide segment; along the second direction, the second guide segment is located on one side or two sides of the second abutting portion;

along the third direction, the second guide piece is connected to a side of the second abutting portion adjacent to the fourth base plate;

the third direction is perpendicular to the first direction and the second direction.

4. The adapter terminal according to claim 3, wherein the first abutting portion and the first guide segment extend along a first arc-shaped surface; the second abutting portion and the second guide segment extend along a second arc-shaped surface.

5. The adapter terminal according to claim 4, wherein the second elastic piece portion further comprises a seventh elastic piece and an eighth elastic piece;

the seventh elastic piece extends from the third base plate along the second direction; an extending direction of the seventh elastic piece is opposite to an extending direction of the fifth elastic piece; along the third direction, the seventh elastic piece and the fifth elastic piece at least partially overlap; a part of the seventh elastic piece protruding from the third base plate extends along the first arc-shaped surface;

the eighth elastic piece extends from the fourth base plate along the second direction; an extending direction of the eighth elastic piece is opposite to an extending direction of the sixth elastic piece; along the third direction, the eighth elastic piece and the sixth elastic piece at least partially overlap; a part of the sixth elastic piece protruding from the fourth base plate extends along the second arc-shaped surface.

6. The adapter terminal according to claim 3, wherein the first base portion comprises a first base plate and a second base plate;

the first base plate is connected to another end of the fixing portion along the second direction;

the second base plate is connected to the another end of the fixing portion along the second direction; the first base plate and the second base plate are disposed side by side along the first direction;

the first elastic piece portion comprises a first elastic piece and a second elastic piece;

the first elastic piece is connected to the first base plate; the first elastic piece comprises a first elastic contact portion which extends along a third arc-shaped surface; the first elastic contact portion protrudes beyond the first base plate along the first direction and in a direction away from the second base plate;

the second elastic piece is connected to the second base plate; the second elastic piece comprises a second elastic contact portion which extends along a fourth arc-shaped surface; the second elastic contact portion protrudes beyond the second base plate along the first direction and in a direction away from the first base plate.

7. The adapter terminal according to claim 6, wherein the first elastic piece portion further comprises a third elastic piece and a fourth elastic piece;

the third elastic piece extends from the first base plate along the second direction; an extending direction of the third elastic piece is opposite to an extending direction of the first elastic piece; along the third direction, the third elastic piece and the first elastic piece at least partially overlap; a part of the third elastic piece protruding from the first base plate extends along the third arc-shaped surface;

the fourth elastic piece extends from the second base plate along the second direction; an extending direction of the fourth elastic piece is opposite to an extending direction of the second elastic piece; along the third direction, the fourth elastic piece and the second elastic piece at least partially overlap; a part of the second elastic piece protruding from the second base plate extends along the fourth arc-shaped surface.

8. The adapter terminal according to claim 6, wherein the fixing portion comprises a first fixing wall, a second fixing wall opposite to the first fixing wall, a first connecting wall connecting one end of the first fixing wall and one end of the second fixing wall, and a second connecting wall connecting another end of the first fixing wall and another end of the second fixing wall;

along the second direction, one end of the first fixing wall is connected to the first base plate, and another end of the first fixing wall is connected to the third base plate; one end of the second fixing wall is connected to the second base plate, and another end of the second fixing wall is connected to the fourth base plate;

along the first direction, the first fixing wall and the second fixing wall are at least partially separated by a certain distance.

9. A connector, comprising:

a first conductive terminal; and an adapter terminal mated with the first conductive terminal;

the adapter terminal, comprising:

a fixing portion;

a first mating portion, the first mating portion being connected with the fixing portion; the first mating portion being configured to be mated with the first conductive terminal; the first mating portion comprising a first base portion and a first elastic piece portion at least partially protruding from the first base portion; and a second mating portion, the second mating portion being connected with the fixing portion; the second mating portion being configured to be mated with a conductive terminal of a mating connector; the second mating portion comprising a second base portion and a second elastic piece portion at least partially protruding from the second base portion;

wherein the second elastic piece portion comprises an abutting portion;

wherein the second base portion comprises a third base plate and a fourth base plate;

the third base plate is connected to one end of the fixing portion along a second direction;

the fourth base plate is connected to the one end of the fixing portion along the second direction; the third base plate and the fourth base plate are disposed side by side along a first direction;

the second elastic piece portion comprises a fifth elastic piece and a sixth elastic piece;

the abutting portion comprises a first abutting portion and a second abutting portion;

the fifth elastic piece is connected to the third base plate, and the fifth elastic piece comprises the first abutting portion; the first abutting portion protrudes beyond the third base plate along the first direction and in a direction away from the fourth base plate;

the sixth elastic piece is connected to the fourth base plate; the sixth elastic piece comprises the second abutting portion; the second contact portion protrudes beyond the fourth base plate along the first direction and in a direction away from the third base plate;

the second direction is perpendicular to the first direction.

10. The connector according to claim 9, wherein the second elastic piece portion comprises a first guide portion and a second guide portion;

the first guide portion and the second guide portion smoothly extend from the abutting portion toward the second base portion along different mating directions.

11. The connector according to claim 10, wherein the first guide portion comprises a first guide segment and a second guide segment;

the second guide portion comprises a first guide piece and a second guide piece;

the fifth elastic piece extends along the second direction; the fifth elastic piece comprises the first guide segment; along the second direction, the first guide segment is located on one side or two sides of the first abutting portion;

along the third direction, the first guide piece is connected to a side of the first abutting portion adjacent to the third base plate;

the sixth elastic piece extends along the second direction; the sixth elastic piece comprises the second guide segment; along the second direction, the second guide segment is located on one side or two sides of the second abutting portion;

along the third direction, the second guide piece is connected to a side of the second abutting portion adjacent to the fourth base plate;

the third direction is perpendicular to the first direction and the second direction.

12. The connector according to claim 11, wherein the first base portion comprises a first base plate and a second base plate;

the first base plate is connected to another end of the fixing portion along the second direction;

the second base plate is connected to the another end of the fixing portion along the second direction; the first base plate and the second base plate are disposed side by side along the first direction;

the first elastic piece portion comprises a first elastic piece and a second elastic piece;

the first elastic piece is connected to the first base plate; the first elastic piece comprises a first elastic contact portion which extends along a third arc-shaped surface; the first elastic contact portion protrudes beyond the first base plate along the first direction and in a direction away from the second base plate;

the second elastic piece is connected to the second base plate; the second elastic piece comprises a second elastic contact portion which extends along a fourth arc-shaped surface; the second elastic contact portion protrudes beyond the second base plate along the first direction and in a direction away from the first base plate.

13. The connector according to claim 12, wherein the first elastic piece portion further comprises a third elastic piece and a fourth elastic piece;

the third elastic piece extends from the first base plate along the second direction; an extending direction of the third elastic piece is opposite to an extending direction of the first elastic piece; along the third direction, the third elastic piece and the first elastic piece at least partially overlap; a part of the third elastic piece protruding from the first base plate extends along the third arc-shaped surface;

the fourth elastic piece extends from the second base plate along the second direction; an extending direction of the fourth elastic piece is opposite to an extending direction of the second elastic piece; along the third direction, the fourth elastic piece and the second elastic piece at least partially overlap; a part of the second elastic piece protruding from the second base plate extends along the fourth arc-shaped surface.

14. A connector assembly, comprising:

a connector; and a mating connector;

the connector, comprising:

a first conductive terminal; and an adapter terminal mated with the first conductive terminal;

the adapter terminal, comprising:

a fixing portion;

a first mating portion, the first mating portion being connected with the fixing portion; the first mating portion being configured to be mated with the first conductive terminal; the first mating portion comprising a first base portion and a first elastic piece portion at least partially protruding from the first base portion; and a second mating portion, the second mating portion being connected with the fixing portion; the second mating portion comprising a second base portion and a second elastic piece portion at least partially protruding from the second base portion;

the mating connector comprising a second conductive terminal configured to be mated with the second mating portion of the adapter terminal;

wherein the second elastic piece portion comprises an abutting portion;

wherein the second base portion comprises a third base plate and a fourth base plate;

the third base plate is connected to one end of the fixing portion along a second direction;

the fourth base plate is connected to the one end of the fixing portion along the second direction; the third base plate and the fourth base plate are disposed side by side along a first direction;

the second elastic piece portion comprises a fifth elastic piece and a sixth elastic piece;

the abutting portion comprises a first abutting portion and a second abutting portion;

the fifth elastic piece is connected to the third base plate, and the fifth elastic piece comprises the first abutting portion; the first abutting portion protrudes beyond the third base plate along the first direction and in a direction away from the fourth base plate;

the sixth elastic piece is connected to the fourth base plate; the sixth elastic piece comprises the second abutting portion; the second contact portion protrudes beyond the fourth base plate along the first direction and in a direction away from the third base plate;

the second direction is perpendicular to the first direction.

15. The connector assembly according to claim 14, wherein the second elastic piece portion comprises a first guide portion and a second guide portion;

the first guide portion and the second guide portion smoothly extend from the abutting portion toward the second base portion along different mating directions.

16. The connector assembly according to claim 15, wherein the first guide portion comprises a first guide segment and a second guide segment;

the second guide portion comprises a first guide piece and a second guide piece;

the fifth elastic piece extends along the second direction; the fifth elastic piece comprises the first guide segment; along the second direction, the first guide segment is located on one side or two sides of the first abutting portion;

along the third direction, the first guide piece is connected to a side of the first abutting portion adjacent to the third base plate;

the sixth elastic piece extends along the second direction; the sixth elastic piece comprises the second guide segment; along the second direction, the second guide segment is located on one side or two sides of the second abutting portion;

along the third direction, the second guide piece is connected to a side of the second abutting portion adjacent to the fourth base plate;

the third direction is perpendicular to the first direction and the second direction.

17. The connector assembly according to claim 16, wherein the first base portion comprises a first base plate and a second base plate;

the first base plate is connected to another end of the fixing portion along the second direction;

the second base plate is connected to the another end of the fixing portion along the second direction; the first base plate and the second base plate are disposed side by side along the first direction;

the first elastic piece portion comprises a first elastic piece and a second elastic piece;

the first elastic piece is connected to the first base plate; the first elastic piece comprises a first elastic contact portion which extends along a third arc-shaped surface; the first elastic contact portion protrudes beyond the first base plate along the first direction and in a direction away from the second base plate;

the second elastic piece is connected to the second base plate; the second elastic piece comprises a second elastic contact portion which extends along a fourth arc-shaped surface; the second elastic contact portion protrudes beyond the second base plate along the first direction and in a direction away from the first base plate.

* * * * *